United States Patent
Perrin et al.

(10) Patent No.: US 9,678,585 B2
(45) Date of Patent: Jun. 13, 2017

(54) PEN SWITCHING BETWEEN ACTIVE AND PASSIVE STATUS

(71) Applicant: Lenovo (Singapore) Pte. Ltd., Singapore (SG)

(72) Inventors: Steven Richard Perrin, Raleigh, NC (US); John Weldon Nicholson, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/276,312

(22) Filed: May 13, 2014

(65) Prior Publication Data

US 2015/0331502 A1    Nov. 19, 2015

(51) Int. Cl.
*G06F 3/038* (2013.01)
*G06F 3/041* (2006.01)
*G06F 3/0354* (2013.01)

(52) U.S. Cl.
CPC ............ *G06F 3/038* (2013.01); *G06F 3/0383* (2013.01); *G06F 3/03545* (2013.01); *G06F 3/041* (2013.01); *G06F 3/0416* (2013.01)

(58) Field of Classification Search
IPC .................................................... G06F 3/03545
See application file for complete search history.

(56) References Cited

U.S. PATENT DOCUMENTS

| | | | |
|---|---|---|---|
| 2013/0033442 A1* | 2/2013 | Chu | G06F 3/044 345/173 |
| 2013/0106714 A1* | 5/2013 | Shahparnia et al. | 345/173 |
| 2014/0267184 A1* | 9/2014 | Bathiche et al. | 345/179 |

* cited by examiner

*Primary Examiner* — Robin Mishler
(74) *Attorney, Agent, or Firm* — Ference & Associates LLC

(57) ABSTRACT

An embodiment provides a method, including: identifying, using a processor, a pen characteristic; identifying, using a processor, an inability to communicate between the pen and an input component using the pen characteristic; and responsive to detecting the inability, disabling a pen feature. Other embodiments, including systems, devices and products, are described and claimed.

20 Claims, 4 Drawing Sheets

PEN SWITCHING BETWEEN ACTIVE AND PASSIVE STATUS

BACKGROUND

Devices, e.g., tablets, smart phones, laptops having a digitizer, etc., are increasingly being used in connection with a pen or stylus (hereinafter these terms are used interchangeably) as an input modality. Certain inputs are possible using a completely passive pen, i.e., where the pen itself is not actively transmitting information but simply serves as an implement to provide contact with a screen—similar to a finger input. Other pens are semi-passive in that they transmit data, e.g., location data, but in a reactive manner, e.g., in response to transmission from a digitizer. Still other pens are so-called "smart pens" that actively transmit input data, e.g., location data, other input data (e.g., button press data, pen status data, etc.) from the smart pen to the device. Smart pens are powered and actively communicate such input data via a low bandwidth pen data channel. Typically each smart pen type uses a proprietary low bandwidth pen data channel.

Active pens increase the signal to noise ratio (SNR) at the sensor/input component by emitting an amplified signal. As a result of the higher SNR, algorithms which detect the pen are able to improve their accuracy and precision. However, the characteristics of the amplified signal are specific to a given pen vendor and will degrade performance if the pen is used on a system or device from another vendor. It is not possible to use the same active pen on systems or devices from different vendors.

BRIEF SUMMARY

In summary, one aspect provides a method, comprising: identifying, using a processor, a pen characteristic; identifying, using a processor, an inability to communicate between the pen and an input component using the pen characteristic; and responsive to detecting the inability, disabling a pen feature.

Another aspect provides a device, comprising: an input component accepting pen input; a display; a processor operatively coupled to the input component and the display; and a memory storing instructions that are executable by the processor to: identify a pen characteristic; identify an inability to communicate between the pen and the input component using the pen characteristic; and responsive to detecting the inability, accept passive inputs of the pen.

A further aspect provides a smart pen, comprising: a tip; and a body; the body including a processor and a memory storing instructions that are executable by the processor to: identify a pen characteristic; identify an inability to communicate with an input component of a device; and responsive to detecting the inability, disable a pen feature.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
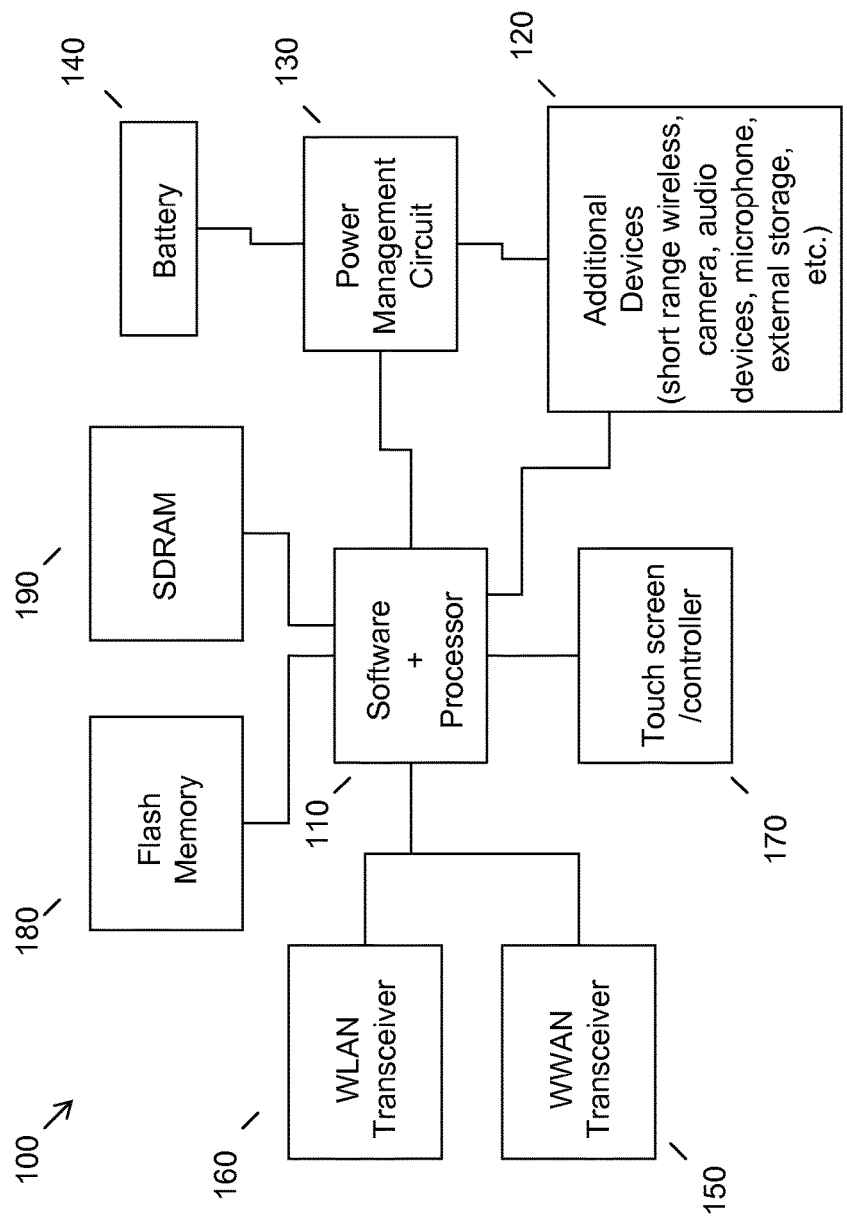
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, it is not possible to use the same active pen on systems from different vendors. Purely passive (e.g., capacitive) pens are operable with sensor systems from any vendor. However, because passive pens do not amplify their signal, they offer lower accuracy and precision at all times.

An embodiment facilitates a matching between the pen's capabilities and those of the sensor/input component. In an embodiment, an active stylus (smart pen) detects the type of system that it is working with and activates its amplified signal only when the system will support it. The user may use the same pen on otherwise incompatible systems, e.g., in a passive mode, and will experience the best performance possible on any given system.

One embodiment may use a short range wireless connection, e.g., a BLUETOOTH connection, to communicate between pen and system. When a BLUETOOTH radio establishes a connection, the system and pen may exchange information about their capabilities. The pen and system may negotiate the best signaling protocol that is mutually supported. Active signaling is generally more accurate than passive, unless there is a mismatch between the pen and the input component.

Pen status information such as control information (e.g., pen pressure, button press, etc.) may be sent from the pen to the system using a BLUETOOTH data channel or using a data channel superimposed on the active signal from the pen (i.e., the low bandwidth pen input data channel, if it is active). When in use, the active signal (pen input data channel) may be used because it is more accurately synchronized with pen position information. When the active signal is not in use, control information may be redirected, e.g., using a BLUETOOTH connection.

If a passive pen is used to establish a short range wireless connection, i.e., the pen is used as a passive or inactive input implement, the pen may provide to the system information about its characteristics (e.g., effective capacitance, nib area, etc.) for example by use of the short range wireless connection. Algorithms on the system may be optimized for these characteristics. BLUETOOTH ranging or other short range wireless ranging may be used to detect when the pen has been moved and/or paired to a new system.

When the user long presses the pen tip on an input component, or otherwise initiates a connection should be established, the pen may be configured to automatically connect to the closest available system, as for example described in commonly assigned U.S. patent application Ser. No. 14/276,260, filed concurrently herewith and incorporated by reference herein. Other mechanisms may be used to establish a short range wireless connection, e.g., manual inputs.

Therefore, in an embodiment, a mismatch or inability to communicate between the device's input component and the pen using the pen input data channel may be used as a cue to either turn off the pen's pen input data channel (which may include altering the device's input component looking for such input), or switch to another, i.e., compatible, pen input data channel. Even in a passive mode, the pen and device may communicate, e.g., via a short range wireless connection such as a BLUETOOTH connection.

The illustrated example embodiments will be best understood by reference to the figures. The following description is intended only by way of example, and simply illustrates certain example embodiments.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In some designs the BMU is included in the battery itself, although control may be distributed or handled remotely (e.g., in connection with the system processor). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. Commonly, system 100 will include a touch screen/controller 170 for data input and display, e.g., via a stylus or pen as described herein, which may itself include a digitizer or like pen input component or component(s), whether or not co-located with (e.g., overlaying) a display screen. System 100 also typically includes various memory devices, for example flash memory 180 and SDRAM 190.

Figure 2:
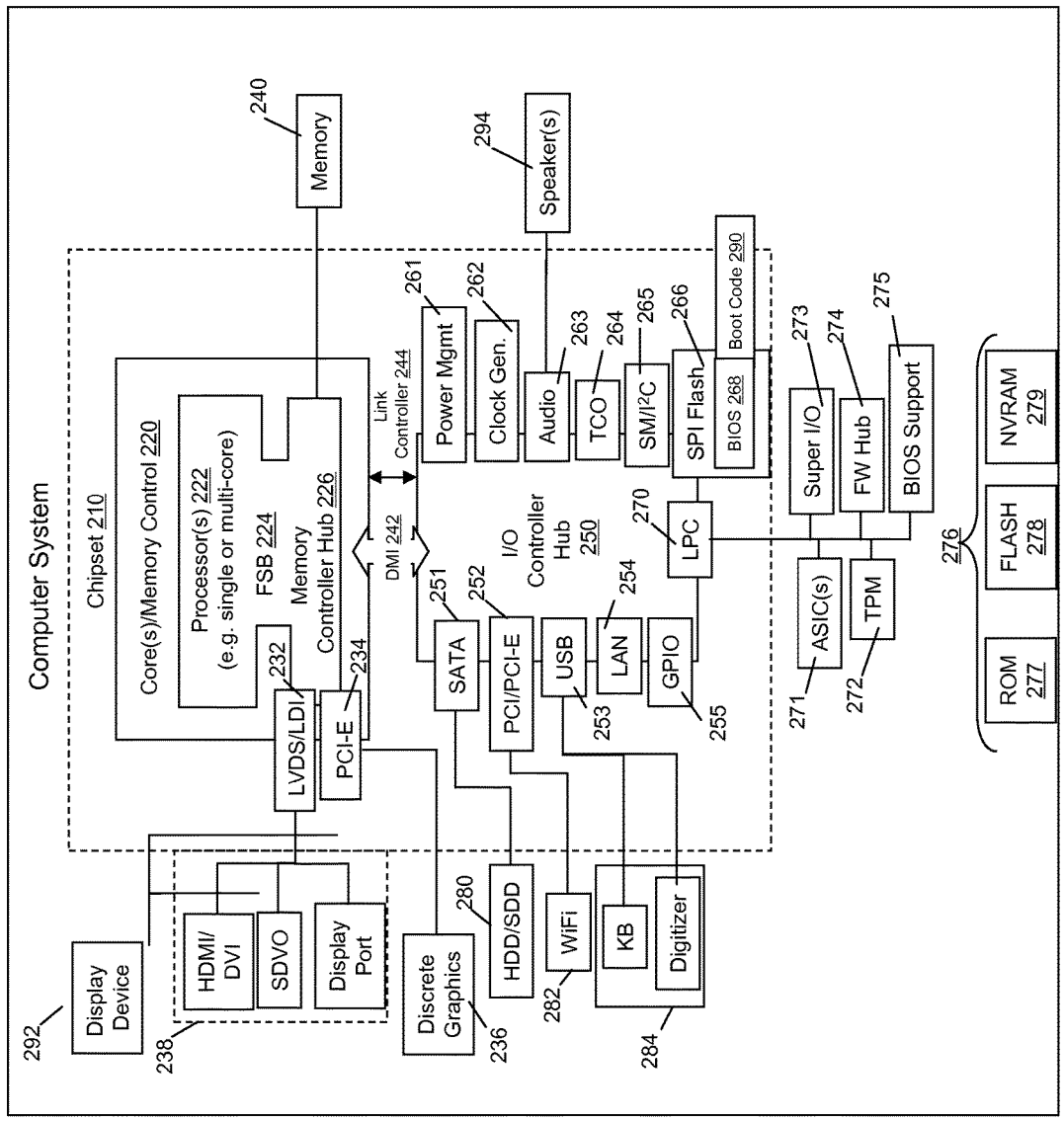
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer that accepts pen inputs, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261 may manage power output and charging, e.g., as supplied via one or more battery cells of the type described herein, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that provide a pen input component, e.g., a digitizer such as 284 or a touch screen 170, or a combination of the foregoing, that accepts pen data input, e.g., using a low bandwidth pen input data channel. Moreover, such circuitry may include components or elements such as short range wireless radios (such as BLUETOOTH or WI-FI radios, as non-limiting examples) and associated modules, e.g., as illustrated at 120, such that a higher bandwidth short range wireless connection may be established.

Figure 3:
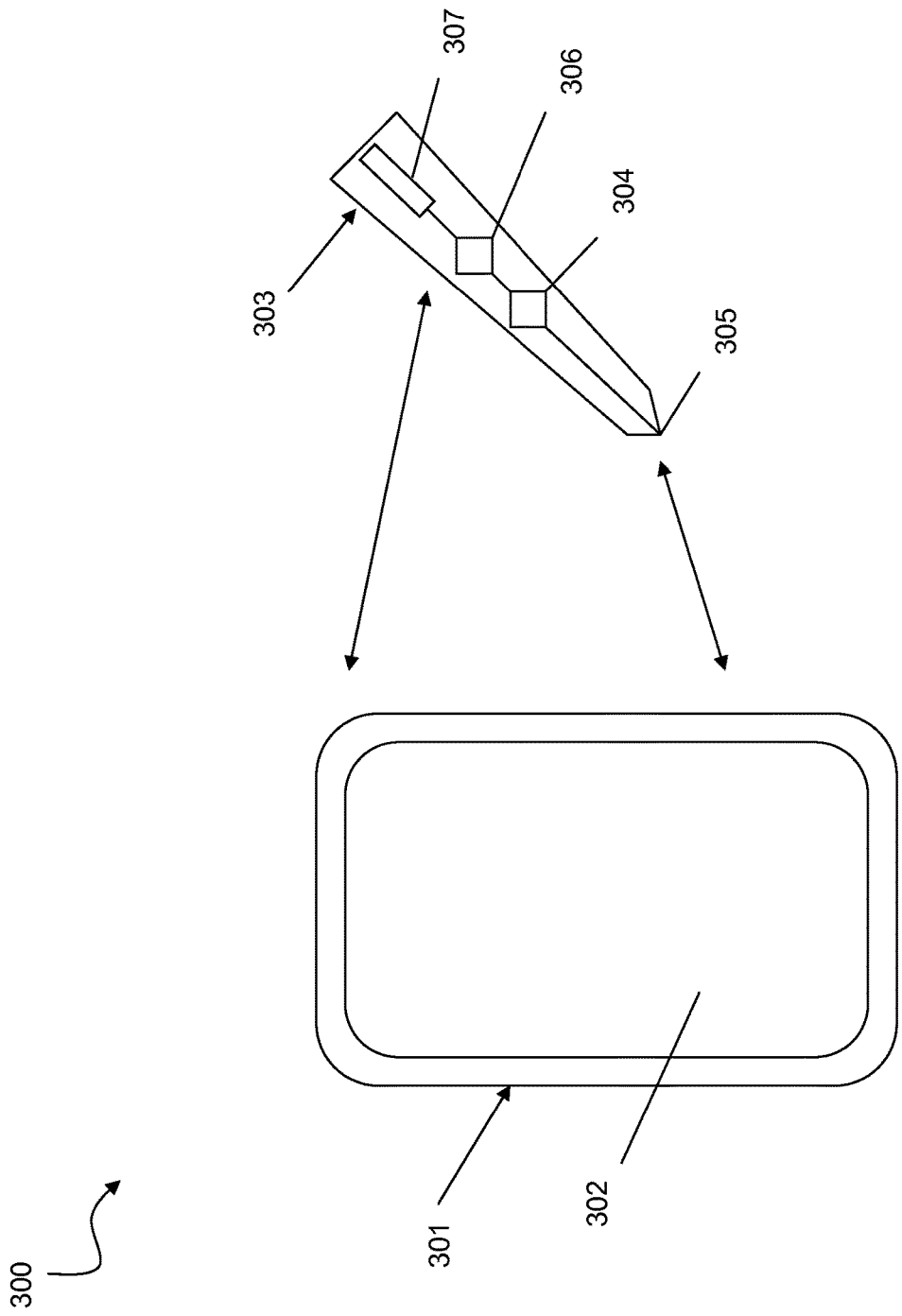
FIG. 3 illustrates an example of smart pen and device communications.

In an embodiment, as illustrated in FIG. 3, a system 300 includes a device 301, e.g., a tablet or smart phone, etc., that includes an input component 302, e.g., touch screen or like surface that accepts pen inputs. The input component 302 accepting smart pen input from a smart pen 303 may be co-located with a display surface, as illustrated, but this is not a requirement. The device 301 includes a processor operatively coupled to the input component 302 and a memory storing instructions that are executable by the processor to receive data from the smart pen 303, e.g., at the input component 302, using a low bandwidth pen input data channel, as illustrated. This pen input data may include short range wireless pairing data, though this is not a requirement for first time pairing and/or connecting. Thus, the device 301 and/or the pen 303 may communicate, in a connected condition, higher bandwidth data using the short range wireless connection. This permits a great deal of additional data, e.g., including media files, sensor data, other pen information, and the like, to be transmitted between the pen 303 and the device 301. This may expand uses for the pen 303 and pen 303 and device 301 combinations.

A smart pen 303, including a tip element 305 and a body housing a processor and a memory 304 storing instructions that are executable by the processor 304 may thus be used to establish such connections. This may include, for example, transmitting connecting data to a device 301 using a low bandwidth pen input data channel via tip element 305. This may in turn allow the pen 303 to establish, using said data, a short range wireless connection with the device 301, e.g., via further automated communications with the device 301.

Figure 4:
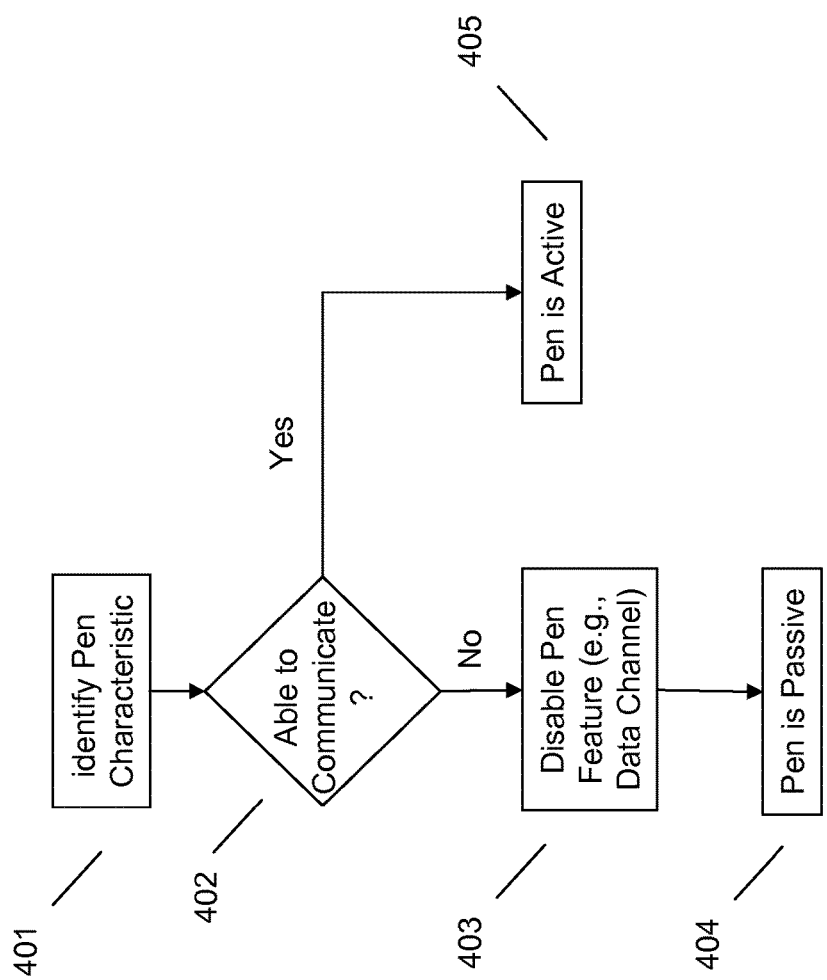
FIG. 4 illustrates an example method of smart pen switching.

In an embodiment, and referring to FIG. 4, a method of switching a pen between active and passive status (with respect to the pen input data channel) is provided. As illustrated, the pen type (or other characteristic) may be determined or identified at 401. This may include the smart pen determining or identifying the proprietary format of the pen data channel which it uses and/or may include or involve the device to which the pen connects. At 402, a mismatch or inability to communicate using the pen input data channel, i.e., between the pen and an input component, may be detected. Again, this may be accomplished by the smart pen, e.g., by a timeout function regarding inability to communicate with a sensed input component or sensor and/or may involve the device. For example, the device itself may determine that the pen is of an incompatible type or has a mis-matched characteristic, e.g., after a predetermined time or amount of passively received pen inputs.

Responsive to detecting an inability to communicate at 402, a feature of the pen such as the pen input data channel of the pen may be disabled at 403. Thus, the pen may be switched to a passive mode whereby the pen may be used as a passive implement. This disabling may or may not affect connections, e.g., a BLUETOOTH connection. That is, the short range wireless connection may be independent of the pen input data channel operability such that a mismatched pen may nonetheless be connected with the device, e.g., using standard connecting techniques in lieu of an automated connection technique that leverages the pen input data channel. Of course, if there is not a mismatch detected at 402, the pen may remain in an active state at 405 and continue to utilize the pen input data channel in a manner understood by those skilled in the art.

In an embodiment, communication of passive pen inputs responsive to said disabling at 404 may permit a mismatched pen to continue to be used with any system. As described herein, if it is detected that a match exists between the pen and the input component, it may be preferable to keep the pen in active form at 405.

In any event, it will be understood that the pen and device may use the short range wireless connection, if any, to communicate a wide variety of data using the short range wireless connection. This data may include data that would normally be communicated via the pen input data channel and/or additional data. Such data may thus include, e.g., pen status information generally, effective capacitance, nib area, battery level), as well as higher bandwidth data, e.g., media files, pen sensor data, etc. This may include transmission of data that will permit, e.g., even in an inactive pen, an improved accuracy (e.g., by informing the device of the nib area, etc). This may also include data regarding the pen characteristics that may assist in identifying a mismatch or inability to communicate using the pen input data channel.

In an embodiment, rather than simply disabling of pen feature responsive to a mismatch determined at 402, an embodiment may include logic for cycling through several attempts and/or communicating a signal to select an appropriate pen input data channel. By way of example, although smart pens are conventionally formed having only one pen input data channel, a smart pen may be provided having more than one pen input data channel such that, responsive to a mismatch, e.g., as determined at 402, the pen may cycle through its available input data channels in an attempt to identify a matching pen input data channel. Likewise, a device or component thereof may attempt to send a signal to the smart pen identifying the appropriate pen input data channel or itself may attempt to switch channels to match the pen. It will be understood that if another connection is accomplished, e.g., BLUETOOTH connection, such information may be transmitted via short range wireless communication.

Accordingly, an embodiment provides a device 301 that includes an input component 302 accepting pen input, which may be co-located with a display. A processor of the device 301 may determine a pen characteristic of a pen 303 in order to detect if a mismatch or inability to communicate between the pen and the input component exists. If so, the device 301 may accept passive inputs of the pen 303 and/or attempt to coordinate with the pen 303 to establish an appropriate active pen input data channel. This may include communication, e.g., using a short range wireless connection, between the pen 303 and the device 301. If an appropriate pen input data channel cannot be determined, the device 301 may communicate a signal to the pen 303 for disabling the pen and/or power off or otherwise making the input component 302 unresponsive to active signaling of the pen using the incorrect pen input data channel, e.g., responsive to a predetermined time threshold of receiving passive pen inputs, detection of a mismatch in frequency, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using a processor, a pen characteristic of an active pen;
   identifying, using a processor, an inability to communicate between the active pen and an input surface using the pen characteristic; and
   responsive to establishing an inability to communicate between the active pen and the input surface, disabling a pen data communication feature of the input surface and operating the input surface in a passive pen mode.

2. The method of claim 1, further comprising communicating passive pen inputs responsive to said disabling.

3. The method of claim 1, further comprising:
   establishing a data connection between the active pen with the input surface.

4. The method of claim 3, wherein said establishing comprises establishing a short range wireless connection between the active pen and a device in which the input surface is housed.

5. The method of claim 1, further comprising communicating, using a short range wireless connection, data between the active pen and a device having the input surface.

6. The method of claim 5, wherein said data comprises pen information selected from the group consisting of effective capacitance, nib area, battery level, tip pressure, button status, pen capability, and pen identification.

7. The method of claim 1, wherein said identifying, using a processor, a pen characteristic, further comprises identifying a characteristic selected from the group consisting of effective capacitance, nib area, and tip pressure.

8. The method of claim 1, further comprising:
   responsive to detecting the inability, switching to another pen data channel.

9. The method of claim 8, wherein said switching is iterated through a predetermined list.

10. The method of claim 1, further comprising:
    responsive to detecting the inability, selecting another pen data channel that matches the input surface.

11. A device, comprising:
    an input surface accepting active pen input;
    a display;
    a processor operatively coupled to the input surface and the display; and
    a memory storing instructions that are executable by the processor to:
    identify a pen characteristic of an active pen;
    identify an inability to communicate between the active pen and the input surface using the pen characteristic; and
    responsive to establishing an inability to communicate between the active pen and the input surface, disable a pen feature data communication feature of the input surface and operate the input surface in a passive pen mode.

12. The device of claim 11, further comprising communicating a signal to the pen for disabling the active pen.

13. The device of claim 11, wherein the instructions are further executable by the processor to establish a data connection between the pen with the input surface.

14. The device of claim 13, wherein to establish a data connection comprises establishing a short range wireless connection between the active pen and the device.

15. The device of claim 14, wherein the instructions are further executable by the processor to receive data using said short range wireless connection.

16. The device of claim 14, wherein the data using said short range wireless connection comprises pen information selected from the group consisting of effective capacitance, nib area, battery level, tip pressure, button status, pen capability, and pen identification.

17. The device of claim 16, wherein to identify a pen characteristic comprises identifying a characteristic selected from the group consisting of effective capacitance, nib area, and tip pressure.

18. The device of claim 11, wherein the instructions are further executable by the processor to:
responsive to detecting the inability, communicate a signal to the active pen for switching to another pen input data channel.

19. The device of claim 18, wherein the signal to the active pen indicates another pen input data channel that matches the input surface.

20. A computer program product, comprising:
a storage device that stored code that is executable by a processor and comprises:
code that identifies a pen characteristic of an active pen;
code that identifies an inability to communicate between the active pen and an input surface using the pen characteristic; and
code that, responsive to establishing an inability to communicate between the active pen and the input surface, disables a pen data communication feature of the input surface to operate the input surface in a passive pen mode.

* * * * *